Patented Nov. 11, 1941

2,262,002

UNITED STATES PATENT OFFICE 2,262,002

PRODUCTION OF ADDITION PRODUCTS FROM DIENES AND COMPOUNDS HAVING AN UNSATURATED CARBON LINKAGE ACTIVATED BY SUBSTITUENTS

Heinrich Hopff and Curt W. Rautenstrauch, Ludwigshafen-on-the-Rhine, Germany, assignors to I. G. Farbenindustrie Aktiengesellschaft, Frankfort-on-the-Main, Germany No Drawing. Application May 16, 1939, Serial No. 274,040. In Germany May 21, 1938

5 Claims. (Cl. 260—514)

The present invention relates to an improved process of producing addition products.

It is already known that dienes will add on to compounds having a double or triple carbon linkage, which are activated by substituents, with the formation of cyclic compounds. This reaction is usually carried out by heating about equimolecular amounts of the intial materials, if desired in the presence of organic diluents, and proceeds generally speaking very vigorously. By reason of the turbulent course of the reaction, side-reactions readily occur which lead to a reduction in the yield or contamination of the reaction products.

We have now found that addition products of dienes and unsaturated compounds having a double or triple carbon linkage activated by substituents are obtained in a smooth and non-objectionable manner by carrying out the reaction in aqueous dispersion in the absence of substances favoring polymerization, advantageously even in the presence of agents preventing polymerization. It is preferable to produce the dispersion by the addition of dispersing or emulsifying agents which promote the solubility of the reaction components in water. Among dienes, i. e. compounds having reactive conjugated double carbon linkages, there may be mentioned butadiene and its substitution products, as for example isoprene, dimethylbutadiene and beta-chlorbutadiene, and also cyclopentadiene, cyclohexadiene, pyrrole and furane. Among substances having a double or triple carbon linkage which is activated by substituents, there may be mentioned especially those having substituents containing a double or triple bond in alpha-position to the said double or triple carbon linkage, as for example maleic anhydride, maleic esters, as for example maleic acid diethyl or dibutyl esters, maleic acid imides, as for example maleic acid methyl imide or isobutyl imide, and the corresponding derivatives of substituted maleic acids, as for example of chlormaleic acid, vinyl compounds having a carbonyl group adjacent to the vinyl group, such as acrolein, vinyl methyl ketone, and also crotonaldehyde, cinnamic aldehyde, cinnamic acid esters, acrylic acid and its homologues and derivatives of the same, as for example acrylic and methacrylic esters, and also quinones, such as benzoquinone, naphthaquinone and chloroquinones, and also vinylpyridine, vinylfurane, nitro-alkenes, such as nitropropene, omega-nitrostyrene, acetylene dicarboxylic acid esters, monovinyl or divinyl acetylenes, and also butadienes and further vinyl esters, vinyl chloride, vinyl ethers, N-vinyl compounds, as for example N-vinylcarbazole and N-vinylpyrrole. Substituents which effect an activation of the double or triple carbon linkages are quite generally positive or negative substituents as may be seen from the foregoing.

Suitable dispersing or emulsifying agents, of which even comparatively small amounts are sufficient, are for example alkylated naphthalene sulphonic acids, sulphuric esters of higher fatty alcohols, addition products of several molecules of ethylene oxide to long-chain organic compounds containing hydroxyl or amino groups, and also the taurides of higher fatty acids or sulphonated fatty acid amides.

In many cases small additions of alcohols, as for example normal butyl alcohol, or of highly polymerized organic compounds having dispersing action, as for example polyvinyl alcohol, polyacrylic acid sodium salt and watersoluble cellulose derivatives are suitable as dispersing agents.

Among agents preventing polymerization there are suitable for example substances of phenolic character, amines, inorganic and organic sulphur compounds and frequently also metallic copper or copper salts.

The reaction usually takes place at relatively low temperatures, as for example between 10° and 100° C. It is sometimes preferable to add buffer substances, as for example inorganic or organic acids or bases and sometimes also salts, such as sodium acetate, potassium bisulphate or primary sodium phosphate.

Usually quantitative yields of the reaction products in a state of excellent purity are obtained. By reason of the effective withdrawal of heat of reaction by the water present, no undesirable increases in temperature take place and therefore no injurious side reactions. Moreover the reaction may be carried out at a speed sufficient in practice even with difficultly reacting substances under mild conditions.

The following examples will further illustrate how this invention may be carried out in practice but the invention is not restricted to these examples. The parts are by weight.

*Example 1*

74 parts of N-isobutyl maleic imide are suspended in 150 parts of water to which 4.5 parts of an amine oxide obtained by treatment of dimethyldodecylamine with hydrogen peroxide have been added, and 44 parts of butadiene are added. The whole is shaken at room temperature in a pressure-tight vessel. After 12 hours, the whole is poured into a solution of 0.5 part of aluminum sulphate in 150 parts of water, crystals of the N-isobutyl-tetrahydro-phthalimide formed thus soon separating in practically a quantitative yield. The compound boils at from 148° to 150° C. at a pressure of 12 millimeters (mercury gauge) and passes over as a colorless oil which soon solidifies to white crystals which melt at 40° C.

Example 2

162.5 parts of N-isobutyl maleic imide are suspended in 500 parts of water to which 10 parts of an addition product of 40 molecules of ethylene oxide to 1 molecule of castor oil have been added. 87.5 parts of dimethylbutadiene are added and the whole stirred vigorously at 40° C. After 12 hours the whole is allowed to cool and the precipitated colorless crystals are filtered off by suction. The yield is quantitative. The N-isobutyl-dimethyl-tetrahydro-phthalimide formed melts at 73° C.

Example 3

75 parts of cyclopentadiene are added to a dispersion of 175 parts of isobutyl maleic imide in 500 parts of water to which 10 parts of the addition product of 20 molecules of ethylene oxide to 1 molecule of dodecyl alcohol have been added. The whole is stirred vigorously at 25° C. After 6 hours, the precipitated crystals of the N-isobutylene-dimethyl-tetrahydrophthalimide formed are filtered off by suction. The compound smells like camphor, is colorless and melts at 73° C. The yield is practically quantitative.

Example 4

114 parts of dimethylbutadiene are emulsified in 500 parts of water to which 10 parts of the emulsifier specified in Example 2 and 5 parts of sodium acetate have been added. 136 parts of maleic anhydride are then added rapidly and the whole stirred at 40° C. After 12 hours, the deposited crystals are filtered off by suction. Dimethyl-tetrahydrophthalic acid is obtained in a good yield.

Example 5

150 parts of dimethylbutadiene are emulsified in 500 parts of water to which 5 parts of the emulsifier specified in Example 2 and 5 parts of sodium acetate have been added. 100 parts of acrylic nitrile are then added and the whole stirred vigorously at 50° C. After 12 hours the resulting emulsion is poured into a solution of 5 parts of aluminum sulphate in 500 parts of water and, after cooling, the organic layer is separated. Dimethyl-tetrahydro-benzonitrile having a boiling point of 96° C. at a pressure of 12 millimeters (mercury gauge) is thus obtained in a good yield.

Example 6

142 parts of benzoquinone are suspended in 500 parts of water containing 10 parts of the emulsifier specified in Example 3 and 5 parts of sodium acetate. 108 parts of dimethyl-butadiene are then added and the whole stirred at 40° C. After 12 hours, the whole is cooled and the deposited pale yellow crystals of the resulting dimethyl-hexahydro-naphthoquinone having a melting point of 117° C. are filtered off by suction. The yield is quantitative.

Example 7

172 parts of maleic acid diethyl ester are emulsified in a solution of 5 parts of the emulsifier specified in Example 2 and 5 parts of sodium acetate in 500 parts of water and 82 parts of dimethylbutadiene are added. The emulsion is stirred at 60° C. for 24 hours and, after cooling, poured into a solution of 10 parts of aluminum sulphate in 500 parts of water. The organic layer is separated and distilled. The boiling point of the resulting tetrahydro-phthalic acid diethyl ester is from 129° to 130° C., at a pressure of 1 millimeter (mercury gauge).

Example 8

53 parts of acrylic nitrile are emulsified in 150 parts of water containing 4.5 parts of the emulsifier specified in Example 1 and 5 parts of sodium acetate. 50 parts of butadiene are then added and the resulting emulsion is shaken for 24 hours in a pressure-tight vessel at room temperature and then poured into a solution of 5 parts of aluminum sulphate in 200 parts of water. The organic layer is separated and distilled. The boiling point of the resulting tetrahydrobenzonitrile is 188° C.

Example 9

74 parts of isoprene are emulsified in a solution of 10 parts of the emulsifier specified in Example 3 and 1 part of hydroquinone in 500 parts of water, 166 parts of N-isobutylmaleic imide are added and the whole stirred for 24 hours at 40° C. Sodium sulphate is then added and the organic layer formed is separated and distilled. Methyl-tetrahydro-N-isobutylphthalimide having a boiling point of from 156° to 157° C. at a pressure of 11 millimeters (mercury gauge) is thus obtained.

Example 10

960 parts of benzoquinone are suspended in an emulsion of 480 parts of butadiene in 6000 parts of water containing 25 parts of the emulsifier specified in Example 3. After stirring for 12 hours in a pressure-tight vessel at 50° C., the whole is cooled. The deposited crystals of tetrahydronaphthoquinone having a melting point of 54° C. are separated. This changes, even by drying at 80° C., rapidly into the isomeric dihydronaphthohydroquinone having a melting point of 207° C. The yield is 80 per cent of that theoretically possible.

Example 11

4000 parts of maleic acid isobutyl ester are emulsified in an emulsion of 1000 parts of butadiene in 10,000 parts of water containing 100 parts of the emulsifier specified in Example 2, 10 parts of hydroquinone and 100 parts of sodium acetate, and stirred at 70° C. in a pressure-tight vessel. After 24 hours, common salt is added and the separated organic layer distilled. The tetrahydro-phthalic acid isobutyl ester thus obtained boils at from 126° to 127° C. at a pressure of 0.5 millimeter (mercury gauge).

Example 12

120 parts of maleic acid isobutyl imide are emulsified in a solution of 10 parts of the emulsifier specified in Example 1 and 5 parts of sodium acetate in 500 parts of water at 50° C. 50 parts of pyrrole are added and the whole stirred for 6 hours at 50° C. After cooling, sodium sulphate solution is stirred in and the organic layer is separated; it soon solidifies to a crystal cake. Tetrahydroendo-N-phthalimide is thus obtained which melts at 122° C. after recrystallization from methanol.

Example 13

137.5 parts of benzoquinone are suspended in an emulsion of 112.5 parts of 2-chlorbutadiene in 500 parts of water containing 10 parts of the emulsifier specified in Example 2. After stirring for 12 hours at 40° C., the whole is cooled to 4° C. and the precipitate formed is filtered off by suction. The tetrahydro-beta-chlornaphthoquinone formed in a yield of 95 per cent is extraordinarily sensitive to light and melts at 95° C.

Example 14

142 parts of monochlorbenzoquinone are suspended in an emulsion of 88 parts of 2-chlorbutadiene in 500 parts of water containing 10 parts of the emulsifier specified in Example 2. After stirring for 12 hours at 40° C., the whole is cooled to 4° C. The 2,7-dichlortetrahydronaphthoquinone having a melting point of 115° C. thus formed is thus precipitated.

Example 15

460 parts of butadiene are emulsified in a pressure-tight vessel in 2200 parts of an aqueous solution of 600 parts of maleic acid, 20 parts of the watersoluble condensation product of 1 molecular proportion of octodecyl alcohol with 40 molecular proportions of ethylene oxide, 2 parts of hydroquinone and 4 parts of sodium acetate. The whole is then heated at from 50 to 60° C. for 10 hours while stirring. On cooling, the tetrahydrophthalic acid formed with a good yield separates out in the form of crystals.

Example 16

114 parts of dimethyl butadiene are emulsified in 535 parts of a 34 per cent aqueous solution of maleic acid after the addition of 10 parts of the condensation product of 1 molecular proportion of castor oil with 40 molecular proportions of ethylene oxide, 5 parts of sodium acetate and 2 parts of hydroquinone. When warming the emulsion thus obtained at 40° C. for 12 hours, dimethyl tetrahydrophthalic acid is formed with a practically quantitative yield.

Example 17

123 parts of dimethyl butadiene are emulsified in a solution of 171 parts of acetylene dicarboxylic acid in 400 parts of water and added with 10 parts of the emulsifying agent specified in Example 2, 5 parts of sodium acetate and 2 parts of hydroquinone. The emulsion thus obtained is warmed at 40° C. for about 30 hours. Crystals of the dimethyldihydrophthalic acid formed separate out. They are filtered off by suction and recrystallized from water, if desired. They melt at from 170 to 171° C.

Example 18

427 parts of vinyl methyl ketone and 315 parts of butadiene are emulsified in a solution containing 1600 parts of water, 40 parts of the emulsifying agent specified in Example 3, 20 parts of sodium acetate and 10 parts of hydroquinone. The whole is warmed at 60° C. for 24 hours in a pressure-tight vessel while stirring. The cyclohexenyl methyl ketone formed with nearly quantitative yield is then distilled off with water vapors, separated from the water and dried by means of calcinated sodium sulphate. It boils at 78° C. under a pressure of 17 millimeters (mercury gauge).

Example 19

50 parts of cinnamic aldehyde and 30 parts of dimethyl butadiene are emulsified in 75 parts of a 2 per cent aqueous solution of the emulsifying agent specified in Example 16. After the addition of 1 part of calcium carbonate the whole is heated at 90° C. while stirring. After about 12 hours common salt is added. The reaction product separates out thereby readily. It boils at 125° C. under a pressure of 0.6 milimeter (mercury gauge).

Example 20

70 parts of croton aldehyde and 54 parts of butadiene are emulsified in a pressure-tight vessel in 100 parts of a 2 per cent aqueous solution of the emulsifying agent specified in Example 15. After adding 1 part of calcium carbonate the whole is heated at 90° C. for 24 hours while stirring. The addition product formed separates after the addition of sodium sulphate. It boils at from 58 to 60° C. under a pressure of 12 millimeters (mercury gauge).

What we claim is:

1. In the production of addition products of dienes with members of the group consisting of unsaturated organic compounds having carbon atoms connected by double bonds activated by substituents and those having carbon atoms connected by triple bonds activated by substituents, the step which comprises carrying out the reaction in aqueous dispersion in the absence of substances favoring polymerization.

2. In the production of addition products of dienes with members of the group consisting of unsaturated organic compounds having carbon atoms connected by double bonds activated by substituents and those having carbon atoms connected by triple bonds activated by substituents, the step which comprises carrying out the reaction in aqueous dispersion in the presence of substances preventing polymerization.

3. In the production of addition products of dienes with members of the group consisting of unsaturated organic compounds having carbon atoms connected by double bonds activated by substituents and those having carbon atoms connected by triple bonds activated by substituents, the step which comprises carrying out the reaction in aqueous dispersion in the presence of substances having a dispersing action and of substances preventing polymerization.

4. In the production of addition products of butadiene with maleic acid, the step which comprises carrying out the reaction in aqueous dispersion.

5. In the production of addition products of butadiene with vinyl methyl ketone, the step which comprises carrying out the reaction in aqueous dispersion.

HEINRICH HOPFF.
CURT W. RAUTENSTRAUCH.